United States Patent

Kobayashi et al.

[15] 3,648,265

[45] Mar. 7, 1972

[54] MAGNETIC DATA STORAGE SYSTEM WITH INTERLEAVED NRZI CODING

[72] Inventors: Hisashi Kobayashi, West Los Angeles, Calif.; Donald T. Tang, Yorktown Heights, N.Y.

[73] Assignee: International Business Machines Corporation, Armonk, N.Y.

[22] Filed: Dec. 30, 1969

[21] Appl. No.: 889,051

[52] U.S. Cl. ..................................340/174.1 G, 340/347 DD

[51] Int. Cl. ..................G11b 5/06, H03k 13/00, H03k 13/24

[58] Field of Search .................340/174.1, 174.1 G, 174.1 H, 340/347 DD; 325/38 A, 38 B; 178/66, 67, 68

[56] References Cited

UNITED STATES PATENTS

| | | | |
|---|---|---|---|
| 3,518,648 | 6/1970 | Norris | 340/174.1 G |
| 3,456,199 | 7/1969 | Gerwen | 340/347 DD |
| 3,417,333 | 12/1968 | Atzenbeck | 178/67 |

OTHER PUBLICATIONS

Tang; D. T. Coding Method to Minimize Intersymbol Interference, IBM Technical Disclosure Bulletin; Vol. 11, No. 12; May 1969. pgs. 1623- 1624.

*Primary Examiner*—Bernard Konick
*Assistant Examiner*—Gary M. Hoffman
*Attorney*—Hanifin and Jancin and Charles P. Boberg

[57] ABSTRACT

A digital magnetic recording system which uses conventional NRZI coding and a readback channel of conventional design operates, in effect, as a precoding and correlative level coding process that is characterized by a transfer function of 1-D (where "D" is a delay operator). Under these conditions, the minimum spacing that can be permitted between adjacent digit symbols in the magnetic recording medium without incurring excessive intersymbol interference during readback is rather large and severely limits the recording density. The present invention uses interleaved NRZI coding and a special filter in the readback channel to provide a precoding and correlative level coding scheme characterized by a transfer function $1\text{-}D^2$. This mode of operation permits much denser packing of the data in the recording medium without causing excessive intersymbol interference during readback.

2 Claims, 7 Drawing Figures

INVENTORS
HISASHI KOBAYASHI
DONALD T. TANG

BY Charles P. Boberg
ATTORNEY

MAGNETIC DATA STORAGE SYSTEM WITH INTERLEAVED NRZI CODING

RELATED APPLICATION

Certain aspects of the present disclosure relating to error detection are disclosed and broadly claimed in a copending application of H. Kobayashi and D. T. Tang, Ser. No. 889,052, filed Dec. 30, 1969.

BACKGROUND OF THE INVENTION

The NRZI coding employed in the conventional binary magnetic recording system represents each "one" in the incoming sequence of binary digits by a change in the magnetization polarity and each "zero" by the absence of any change in polarity. The inherent differentiation in the readback process transforms these changes back to pulses which can be detected.

Representing the incoming sequence as:

$$A(D)=a_o+a_1D+a_2D^2+\ldots,$$

in which $D$ is a delay operator and the power exponent of each $D$ term represents its position in the sequence, the ordinary NRZI encoding and saturation recording operation effectively divides this sequence by the transfer function 1-$D$ and expresses the quotient in "mod 2" form as the precoded sequence:

$$B(D)=B_o+b_1D+b_2D^2+\ldots,$$

wherein the values of the various coefficients can be expressed equivalently by the following relationship:

$$b_k=a_k+b_{k-1}, \text{ mod } 2.$$

The precoded sequence $B(D)$ is recorded in the tape, disk or other magnetic recording medium. Effectively, each digit in this recorded sequence $B(D)$, starting with the second digit therein, is formed by adding the value of the correspondingly positioned digit in the sequence $A(D)$ to the value of the immediately preceding digit in the sequence $B(D)$, and expressing the result of this addition in mod 2 form (i.e., causing the sum of 1+1, wherever it occurs, to be expressed as 0 without a carry to the next binary order). For example, an input sequence of 0110 would be recorded in this conventional manner as: 0100, where 0 and 1 represent two opposite polarities of magnetization.

When the recorded sequence is read back through the conventional readback channel, which utilizes a differentiating type of read head, the output is a correlatively encoded sequence of the one-digit-delay type, characterized by the aforesaid transfer function $1-D$. Thus, the readback operation effectively causes the recorded or precoded sequence $B(D)$ to be multiplied by the transfer function $1-D$ to produce a digit sequence $C(D)$ that may be expressed in the form:

$$C(D)=c_o+c_1D+c_2D^2+\ldots,$$

wherein the values of the various coefficients can be expressed equivalently by the following relationship:

$$c_k=b_k-b_{k-1}$$

Effectively, each digit in the sequence $C(D)$, starting with the second one, is formed by subtracting from the value of the correspondingly positioned digit in the sequence $B(D)$ the value of the immediately preceding digit in the sequence $B(D)$. For example, a recorded sequence of 0100 would be read out in the conventional manner as 01 −1 0.

It may be noted that the sequence $C(D)$, unlike the sequence $B(D)$, is a three-level sequence occupying the three digital value levels of 0, +1 and −1, this increase in the number of levels being a feature of correlative level coding. To retrieve the original input sequence, 0110, the correlatively encoded sequence usually is subjected to a simple rectifying process that merely converts −1 values to +1 values and leaves the other values unchanged. By this simple method of decoding, the sequence $C(D)$ is immediately converted back into the sequence $A(D)$, assuming that no error was introduced into the signal during readback. If an error is introduced during readback, the aforesaid precoding operation effected by the initial NRZI encoding process will prevent this error from being propagated as a chain of errors during readback, but the simple mod 2 detection process is unable to detect the original unpropagated error when it occurs.

The density with which data can be recorded in a magnetic recording system is limited by the minimum amount of spacing that must be allowed between adjacent digit symbols in order to avoid excessive intersymbol interference effects during readback. In a readback channel of conventional design, characterized by a transfer function of $1-D$ as explained above, the limitations on data packing density imposed by intersymbol interference effects prevent one from even remotely realizing the theoretical maximum packing density.

It has been known in data communication work generally that a correlative level coding process having a transfer function of $1-D^2$ is very desirable for transmitting digital sequences through a limited bandpass channel because it reduces intersymbol interference to a controlled amount and therefore enables the digital transmission rate through the channel to be increased. Heretofore no one has conceived applying this principle to the design of magnetic recording systems.

SUMMARY OF THE INVENTION

An object of the invention is to increase the density with which data can be recorded on a magnetic medium and the rate at which it can be reliably read back therefrom in a magnetic data recording system.

The invention is carried out by a combination of novel encoding and readback techniques that together provide a precoding and correlative level process wherein the transfer function of the channel characteristic is $1-D^2$. These techniques involve the use of an interleaved NRZI coding, which interposes a two-digit delay in the summation process whereby the input sequence $A(D)$ is converted into the precoded or recorded sequence $B(D)$. Thus, according to this scheme, $b_k=a_k+b_{k-2}$, mod 2, or stated equivalently, $B(D)=[A(d(1-D^2)]\text{mod } 2$. In the readback channel, special filtering alters the natural channel characteristic to provide an overall transfer function of $1-D^2$. The output of the readback channel then is: $C(D)=B(D)\times(1-D^2)$, equivalently expressed as: $c_k=b_k-b_{k-2}$. Thus, a type of correlative level coding which adequately controls intersymbol interference is achieved. In this system data can be recorded and read reliably at up to twice the density with which it can be recorded and read reliably in the conventional magnetic data recording system.

A further object of the invention is to provide a system of the kind just described having the capability of detecting errors that are introduced into the readback signal due to the effect of extraneous noise or other transient malfunctioning of the readback channel. In place of the conventional mod 2 detector at the channel output, a two-stage decoder is employed for decoding the three-level correlatively encoded sequence furnished by the readback channel. The first decoder effectively divides the correlatively encoded three-level sequence $C'(D)$ by the transfer function $1-D^2$ to generate an intermediate sequence $B'(D)$, which will be identical with the precoded sequence $B(D)$ that was recorded in the recording medium only if no error were introduced during readback. If an error was introduced, then the sequence $B'(D)$ will differ from the sequence $B(D)$. In many if not all instances the nature of the error is such that it causes the sequence $B'(D)$ to occupy a value level which is not among the levels that the sequence $B(D)$ was permitted to occupy. This is due to the inherent redundancy of the three-level encoded output. Hence, even though the recorded sequence $B(D)$ has only two permissible levels, the sequence $B'(D)$ which is read back may occupy a third level, if an error was introduced during readback. A simple error test is performed at this point merely by detecting whether sequence $B'(D)$ occupies any level outside of the permitted two levels, and if so, an error signal is generated. This procedure will detect all errors in $C'(D)$ which can possibly be detected due to its inherent redundancy. The final decoding step effectively multiplies $B'(D)$ by the transfer function $1-D^2$ and expresses the result in mod 2 form as the final output sequence $A'(D)$, which is identical with the original input sequence $A(D)$ if no error is present. The conventional detector cannot derive the intermediate sequence $B'(D)$ from the readback sequence $C'(D)$, but goes directly from the sequence $C'(D)$ to the sequence $A'(D)$; hence it is not able to detect readback errors by the simple level-detection method just described.

Wherever the expression "three-level sequence"; or a similar expression, is used herein, it refers to a sequence generated by a process that is capable of producing sequences which occupy any of three different levels (or whatever number of levels is specified). It does not necessarily mean that any particular sequence generated by such a process will occupy all of those levels, since the number of different levels occupied by any given output sequence is dependent upon the specific digits present in the corresponding input sequence.

DETAILED DESCRIPTION

The present invention relates specifically to magnetic recording systems of the kind in which digital data is stored in a magnetic medium by saturation recording and is read back therefrom by a differentiating type of read head.

Figure 1:
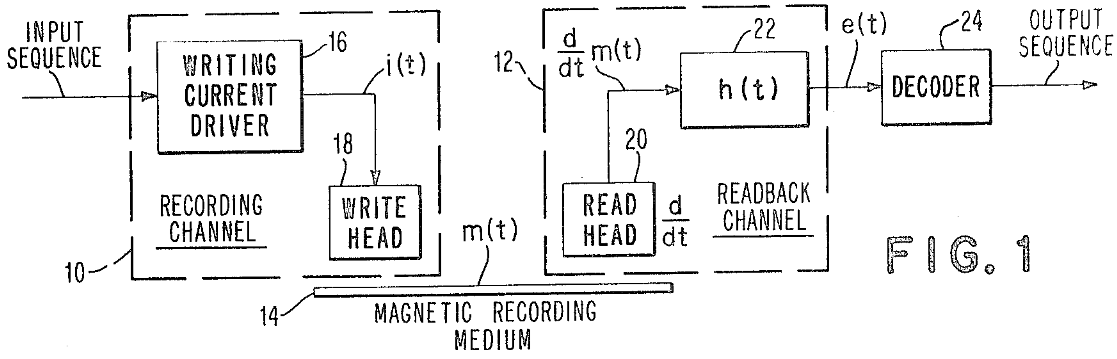
FIG. 1 is a general diagrammatic representation of a magnetic recording system, whether constructed according to conventional design or in accordance with the present invention.
Figure 3:
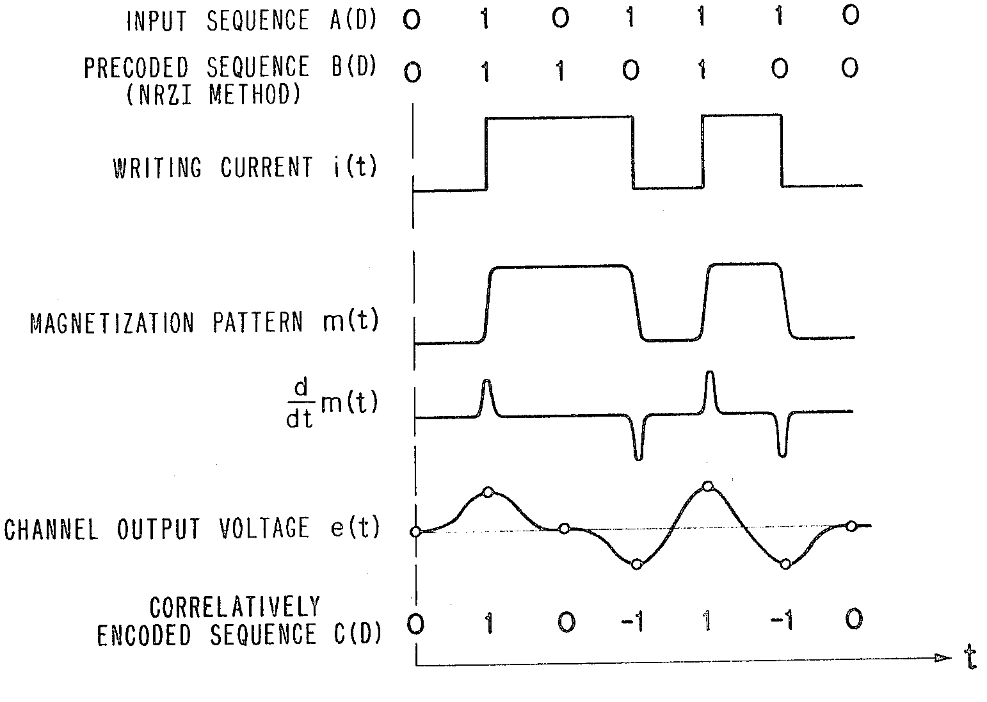
FIG. 3 (PRIOR ART)
FIG. 3 is a timing chart representing the operation of the conventional system shown in FIG. 2.

As shown in FIG. 1, any magnetic recording system includes as its essential elements a recording channel 10, a readback channel 12 and a magnetic recording medium 14 (e.g., tape, disk or drum) in which is stored the information that may be transferred from the channel 10 to the channel 12. In the recording channel 10, a sequence of binary input signals is applied to a writing current driver 16, which supplies an output current having a waveform $i(t)$ to a write head 18. According to the polarity of the drive current at any given instant, the write head 18 causes a discrete portion of the recording medium 14 to be magnetically polarized to saturation in one direction or the other, thereby inducing a selected magnetization pattern $m(t)$ therein. This action is depicted in FIG. 3, for example.

During readback the data representations that were magnetically recorded in the medium 14 are sensed by a read head 20 (which actually may be part of a unitary read-write head assembly that includes a write head such as 18). The read head 20 inherently performs a differentiating function, but due to the modifying effect of the magnetic field distribution, this is not a pure differentiating action. For the purpose of illustration, however, the read head 20 may be viewed as a pure differentiating element cascaded with an element 22 having an impulse response characteristic $h(t)$ that constitutes the rest of the readback channel 12. The differentiated output signal $d/dt\ m(t)$ of the read head 20, when passed through the element 22, yields the output voltage $e(t)$ of the readback channel, as shown in FIG. 3 for instance. As a final step in reading out the recorded information, the output voltage waveform $e(t)$ of the readback channel 12 is suitably sampled and decoded by a decoder 24 to retrieve the original input sequence (assuming that no error has been introduced during the recording and readback operations).

The foregoing description of FIG. 1 applies to magnetic recording systems in general. Attention now will be given to a conventional type of recording system which employs NRZI coding to record the digital information and a readback channel having what is termed a "Gaussian" or "unshaped" frequency characteristic, such a system and its operation being depicted in FIGS. 2 and 3.

Using terminology that is more commonly employed in data communication work, but which also has significance when applied to magnetic recording operations, the recording channel 10, FIG. 1, may be regarded as performing the function of a "precoder," while the readback channel 12 performs the function of a "correlative encoder" in an information transfer system of the correlative level coding type. In this type of coding, an $m$-level sequence fed into the encoder is converted to a sequence that may occupy any of the $m$ levels occupied by the input sequence plus one or more additional levels. In effect, the $m$-level input sequence is multiplied by a transfer function $G(D)$ of the general mathematical form $g_0+g_1D+g_2D^2+\ldots$, wherein the $g$ values are arbitrary coefficients and $D$ is a delay operator. The power exponents of D in the various terms of this expression represent relative time delays. Correlative encoding involves multiplying the transfer function $G(D)$ by an input sequence such as $B(D)$, FIG. 2, having the general mathematical form $b_0+b_1D+b_2D^2+\ldots$, to produce an output sequence $C(D)$ of similar mathematical form but which may have more levels than the sequence $B(D)$.

Figure 2:
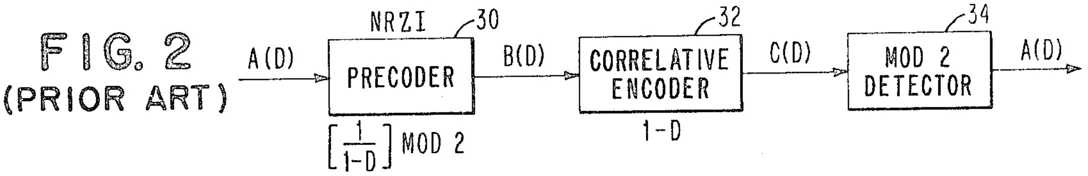
FIG. 2 (PRIOR ART)
FIG. 2 is a diagrammatic representation of a recording system which employs conventional NRZI precoding in the recoding channel and a conventional type of correlative encoding in the readback channel.

In the conventional recording system of FIG. 2, wherein the transfer function $G(D)=1-D$, a two-level input sequence $A(D)$ is converted by a precoder 30 (corresponding to the recording channel 10, FIG. 1) to a two-level precoded sequence $B(D)$, through an NRZI encoding process wherein each 1 in the sequence $A(D)$ causes a change in magnetic polarity at the write head 18 (FIG. 1), while a 0 causes no change in polarity. Effectively, this is a process of dividing $A(D)$ by the function $1-D$ and expressing the quotient in mod 2 form, or to state this equivalently, causing the digits of the sequence $B(D)$ to be related to the digits of the sequence $A(D)$ in the following manner:

$$b_k=a_k+b_{k-1},\ \text{mod } 2.$$

The two-level sequence $B(D)$ is recorded in the medium 14 (FIG. 1) and is read therefrom by the readback channel 12, corresponding to the correlative encoder 32, FIG. 2, in the conventional system. The encoder 32 effectively multiplies the two-level sequence $B(D)$ by the function $1-D$ to produce a three-level sequence $C(D)$, causing the digits of these two sequences to be related in the following manner:

$$c_k=b_k-b_{k-1}$$

FIG. 3 depicts the action that takes place in a recording system of the conventional kind represented in FIG. 2 for an input sequence $A(D)=$ 0 1 0 1 1 1 0. The NRZI precoding process converts this to a sequence $B(D)=$ 0 1 1 0 1 0 0, this being the form in which the sequence is recorded. Each 1 represents a certain magnetic polarity and 0 the opposite polarity in the magnetization pattern $m(t)$. Readback of this recorded signal has a correlative encoding effect, converting the sequence $B(D)$ to the sequence $C(D)=$ 1 0 −1 1 −1 0, which is a three-level sequence occupying the value levels 1, 0 and −1. The sequence $C(D)$ may be converted back into the sequence $A(D)$ merely by changing each −1 value in $C(D)$ to a +1 value. This function is performed by a mod 2 detector 34, FIG. 2, which is simply a full-wave type of rectifier that produces a +1 output in response to either a +1 or a −1 input.

As mentioned hereinabove, the conventional NRZI system of FIG. 2, with its inherent transfer function of $1-D$, does not effectively control intersymbol interference in the readback channel, and in order to reduce such interference to a tolerable amount, it is necessary to observe rather stringent intersymbol spacing requirements when recording data in the magnetic medium.

The present invention aims to reduce these requirements so that a significant increase in recording density can be achieved. In fulfilling this objective, it is desirable not to require extensive alteration of the readback channel characteristic. Both of these purposes are accomplished in the present system, FIG. 4, by incorporating in the readback channel 40 thereof a special corrective filter 42, which in conjunction with the conventional read head and its inherent Gaussian characteristic, produces an overall cosine-shaped frequency characteristic of the kind represented in FIG. 5 of the channel 40. The absolute value of the channel function $H(f)$ is cos $\pi f/2w$, within the width $w$ of the channel frequency bandpass. This type of cosine characteristic provides a readback channel that has the desired correlative encoding function of $1-D^2$ for reducing intersymbol interference effects, and it can be attained with only a moderate amount of corrective filtering action.

Figure 4:
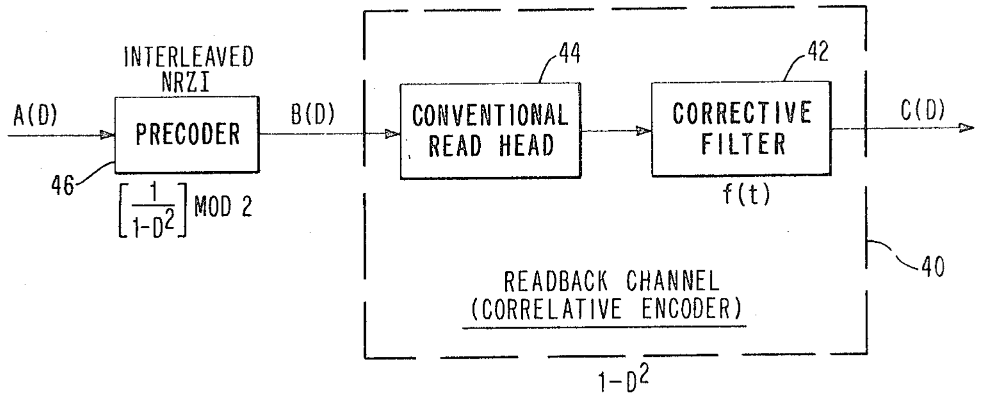
FIG. 4 is a representation of a magnetic recording system constructed in accordance with the principle of the invention, using interleaved NRZI precoding in the recording channel and a compatible type of correlative encoding in the readback channel.
Figure 5:
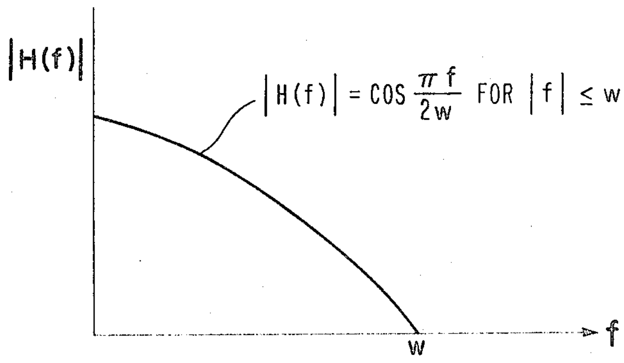
FIG. 5 is a graph depicting the preferred form of frequency response characteristic for the readback channel in an improved system of the kind shown in FIG. 4.

The conventional NRZI encoding method cannot be used in conjunction with the improved type of readback channel 40 shown in FIG. 4. However, a modified type of NRZI coding, herein designated "interleaved NRZI," is suitable for use in the improved system. The interleaving function is herein represented as being performed by a precoder 46, which effectively causes the input sequence $A(D)$ to be divided by the transfer function $1-D^2$, with the resulting quotient being expressed in mod 2 form. Equivalently, the digits of the sequence $B(D)$ are formed from the digits of the sequence $A(D)$ and the preceding digits of $B(D)$ as follows:

$$b_k=a_k+b_{k-2}, \text{ mod } 2.$$

Figure 7:
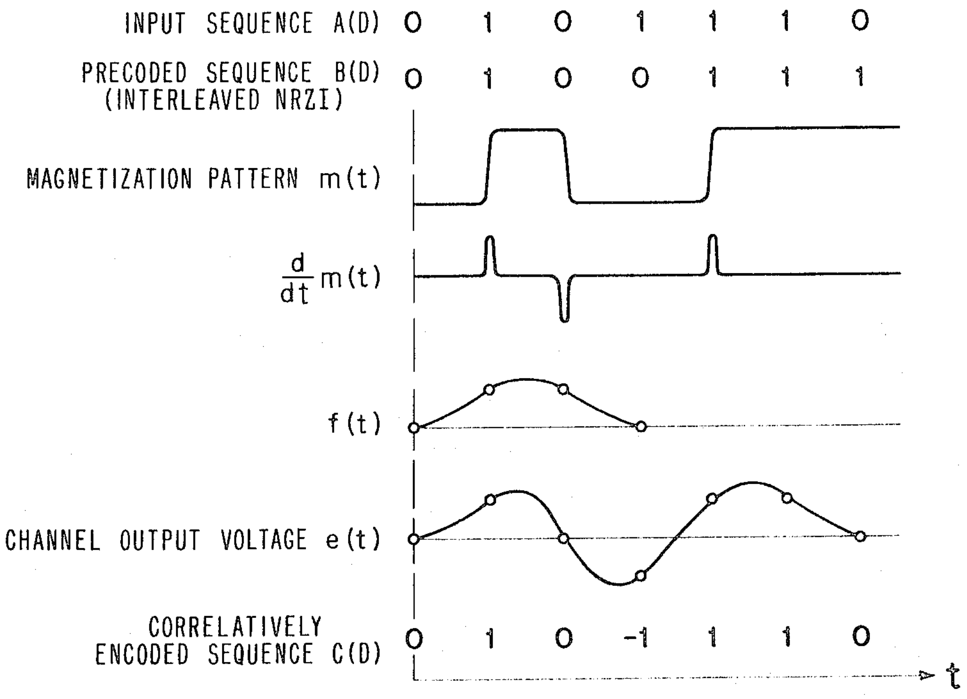
FIG. 7 is a timing chart representing the operation of the improved magnetic recording system shown in FIG. 4.

Such action is depicted in FIG. 7, wherein the representative sequence $A(D)$= 0 1 0 1 1 1 0 is precoded into the sequence $B(D)$=0 1 0 0 1 1 1 by this interleaved NRZI encoding. In effect, interleaved NRZI differs from conventional NRZI in that is causes each $a$ digit (starting with the third) to be added to the inverse of a $b$ digit that has undergone a two-digit delay, as distinguished from the conventional one-digit delay. The encoding circuitry needed for accomplishing this result may readily be adapted from known NRZI circuitry. The precoded sequence $B(D)$ is recorded in the magnetic medium to form the magnetization pattern $m(t)$, FIG. 7.

When the recorded sequence $B(D)$ is read by the conventional read head 44, FIG. 4, with its inherent Gaussian characteristic, and the resultant signal is passed through the corrective filter 42, whose impulse response characteristic $f(t)$ is represented in FIG. 7, the effect is the same as though the sequence $B(D)$ had passed through a correlative encoder 40 having a transfer function $1-D^2$, which when multiplied by the sequence $B(D)$ produces the output sequence $C(D)$, as represented by the output waveform $e(t)$, FIG. 7. To state this equivalently, the digits of the sequence $C(D)$ have the following relationship to the digits of the sequence $B(D)$:

$$c_k=b_k-b_{k-2}.$$

Whereas $B(D)$ was constrained to two levels, however, $C(D)$ is permitted to occupy three levels 1, 0 and −1. The correlative encoding operation performed by the modified readback channel 40 controls the effect of intersymbol interferences to an extent such that the density of data recorded in the magnetic medium can be approximately twice that of data which is magnetically recorded in the conventional manner. Only moderate reshaping of the channel characteristic is required, as noted above.

The correlatively encoded sequence $C(D)$, which in the particular example cited herein is 0 1 0 −1 1 1 0, is readily converted back to the initial sequence $A(D)$ simply by rectifying each −1 value to a +1 value, in the usual manner. This action reduces the number of value levels from three to two.

Figure 6:
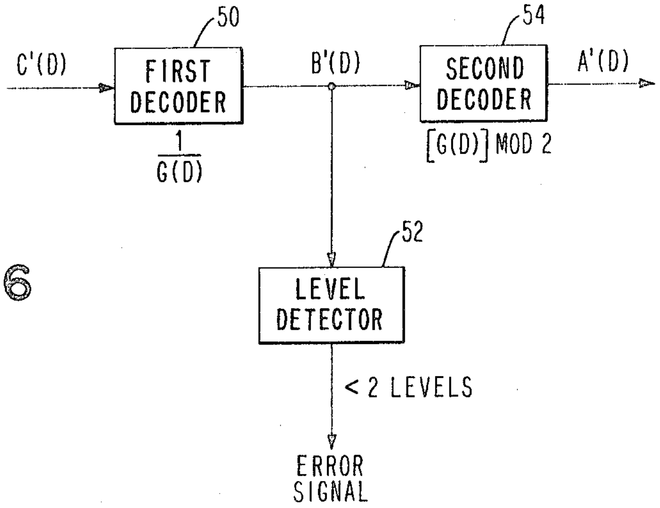
FIG. 6 represents an error detection scheme of a novel type which can be used in conjunction with any correlative level coding scheme that involves precoding.

In the above-mentioned copending patent application of the same inventors, there is disclosed a simple and reliable technique for detecting unpropagated errors that are introduced by channel noise in a data communication system of the correlative level coding type. This same error detecting principle can be applied to a magnetic recording system, whether it employs the conventional mode of correlative encoding (FIG. 2) or the improved method of correlative encoding disclosed herein (FIG. 4). FIG. 6 shows the essential elements of such a scheme.

Let it be assumed that due to noise in the readback channel, the sequence which emerges from this channel is not the correctly encoded sequence $C(D)$ but a sequence $C'(d)$ containing one or more errors introduced by the channel noise, as indicated in FIG. 6. Instead of immediately decoding the sequence $C'(D)$ to the final output sequence $A'(D)$, as is done by the conventional mod 2 detector or rectifier, the present scheme contemplates a two-stage decoding process, in the first stage of which the encoded sequence $C'(D)$ is subjected to a decoding operation that is the inverse of the correlative encoding process which was performed by the readback channel. Whereas the readback channel effectively multiplies the precoded or recorded sequence $B(D)$ by the transfer function $G(D)$ to produce the sequence $C(D)$, the first decoder 50 effectively divides the sequence $C'(D)$ by the same transfer function $G(D)$ to yield an intermediate sequence $B'(D)$, which should be identical with the precoded sequence $B(D)$. Due to the inherent redundancy of correlative level coding, however, a three-level encoded sequence $C'(D)$ containing a readback error may be decoded into a sequence $B'(D)$ that occupies some level other than one of the two levels that the precoded sequence $B(D)$ was permitted to occupy. If any portion of the sequence $B'(D)$ should extend into a level that $B(D)$ was not permitted to occupy, this is an indication that $C'(D)$ contains an error that was introduced therein during the readback operation.

A level detector 52 of simple design may be employed to test the signal levels occupied by the digits in the decoded sequence $B'(D)$. If any digit of $B'(D)$ should occupy a level other than 1 or 0, these being the two levels that the digits of the sequence $B(D)$ were permitted to occupy, then the detector 52 generates an error signal. This may be a simple warning signal to the operator that an error has been detected, or it may initiate a control operation which automatically effects a new reading of the recorded data.

The final stage of the decoding operation, performed by the second decoder 54, FIG. 6, is the inverse of the precoding operation by which the original input sequence $A(D)$ was converted into the recorded sequence $B(D)$. If no error is present in the sequence $B'(D)$, then sequence $A'(D)$ will be identical with the original sequence $A(D)$. This error detecting scheme is applicable to any digital magnetic recording and readback apparatus, whether it has the conventional type of transfer function ($1-D$) or a different function (e.g., $1-D^2$) as disclosed herein.

The invention has been herein described as utilizing an improved NRZI recording method which accomplishes saturation type recording in a unique fashion. With the recording media presently available, this is the most practical way to accomplish the precoding action needed as a prelude to the correlative level coding action that is preformed by the differentiating write head and applicants' novel readback channel filter. It is conceivable that with the development of better recording media, a different type of recording method could provide an equivalent precoding action. It will be understood by those skilled in the art, however, that changes such as these are within the spirit and scope of the invention as taught herein.

We claim:

1. In a magnetic data recording system, the combination of:

a recording channel which performs a precoding process by saturably recording the data in a magnetic medium;

a readback channel which performs a correlative encoding process that involves a greater number of value levels than are available in said recording channel;

a first decoder for subjecting the output of said readback channel to a first decoding process which is the inverse of the correlative encoding process performed by said readback channel;

a level detector for detecting when the output of said first decoder attains a value level that the output of said recording channel is not permitted to attain and for generating an error signal in response to such a condition;

and a second decoder for subjecting the output of said first decoder to a second decoding process which is the inverse of the precoding process performed by said recording channel.

2. In a magnetic recording system wherein a binary input sequence $A(D)$, definable as a series $a_o+a_1D+a_2D^2+ \ldots$ in ascending powers of a delay operator D, is subjected to a precoding operation in the course of being recorded, the combination of:

precoding means including a saturating type write head and a write current driver together constituting an interleaved NRZI encoder for effectively causing the input sequence $A(D)$ to be divided by a transfer function $1-D^2$ and for magnetically recording the result of such division in mod 2 form as a binary precoded sequence $B(D)$;

readback means including a differentiating type read head and a corrective filter, together providing a channel for sensing the recorded binary sequence $B(D)$ and for effectively causing said sequence $B(D)$ to be multiplied by the transfer function $1-D^2$ in order to produce a correlatively encoded sequence $C(D)$;

and decoding means for converting said correlatively encoded sequence $C(D)$ to a corresponding output sequence in mod 2 form, said decoding means including the following elements:

a first decoder for subjecting said correlatively encoded sequence $C(D)$ to a decoding process which is the inverse of the encoding process by which a sequence such as $B(D)$ is converted to sequence such as $C(D)$, thereby producing a sequence $B'(D)$;

a level detector for detecting whether any digit of the sequence $B'(D)$ has a value other than one of the two binary values that may be assumed by the digits of sequences $A(D)$ and $B(D)$, said detector generating an error signal in response to such a condition;

and a second decoder for converting said sequence $B'(D)$ to a corresponding output sequence in mod 2 form.

* * * * *